Oct. 10, 1950     F. V. COLLINS     2,525,590
FEED APPARATUS FOR TUBES
Filed Dec. 7, 1946     2 Sheets-Sheet 1
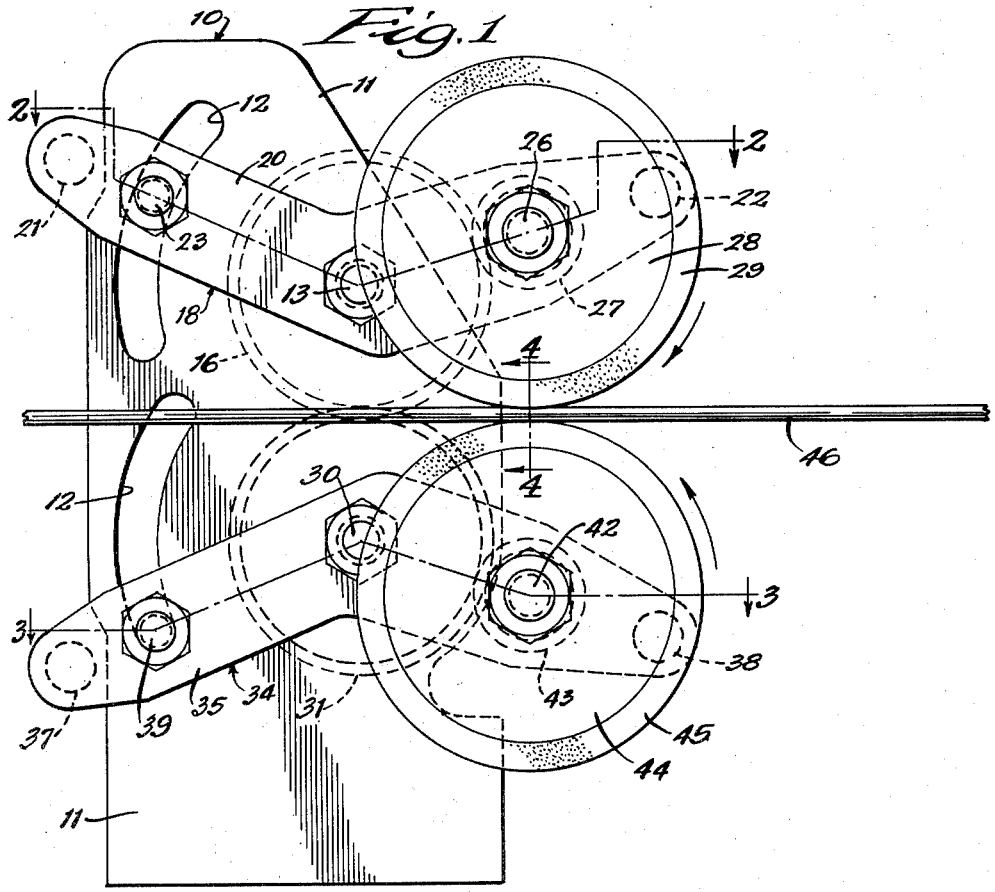
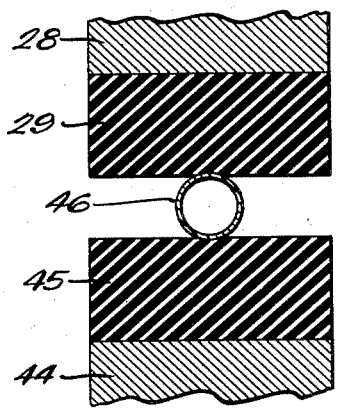
Inventor:
Fred V. Collins,
By Dawson, Cotheay Spangenberg,
Attorneys

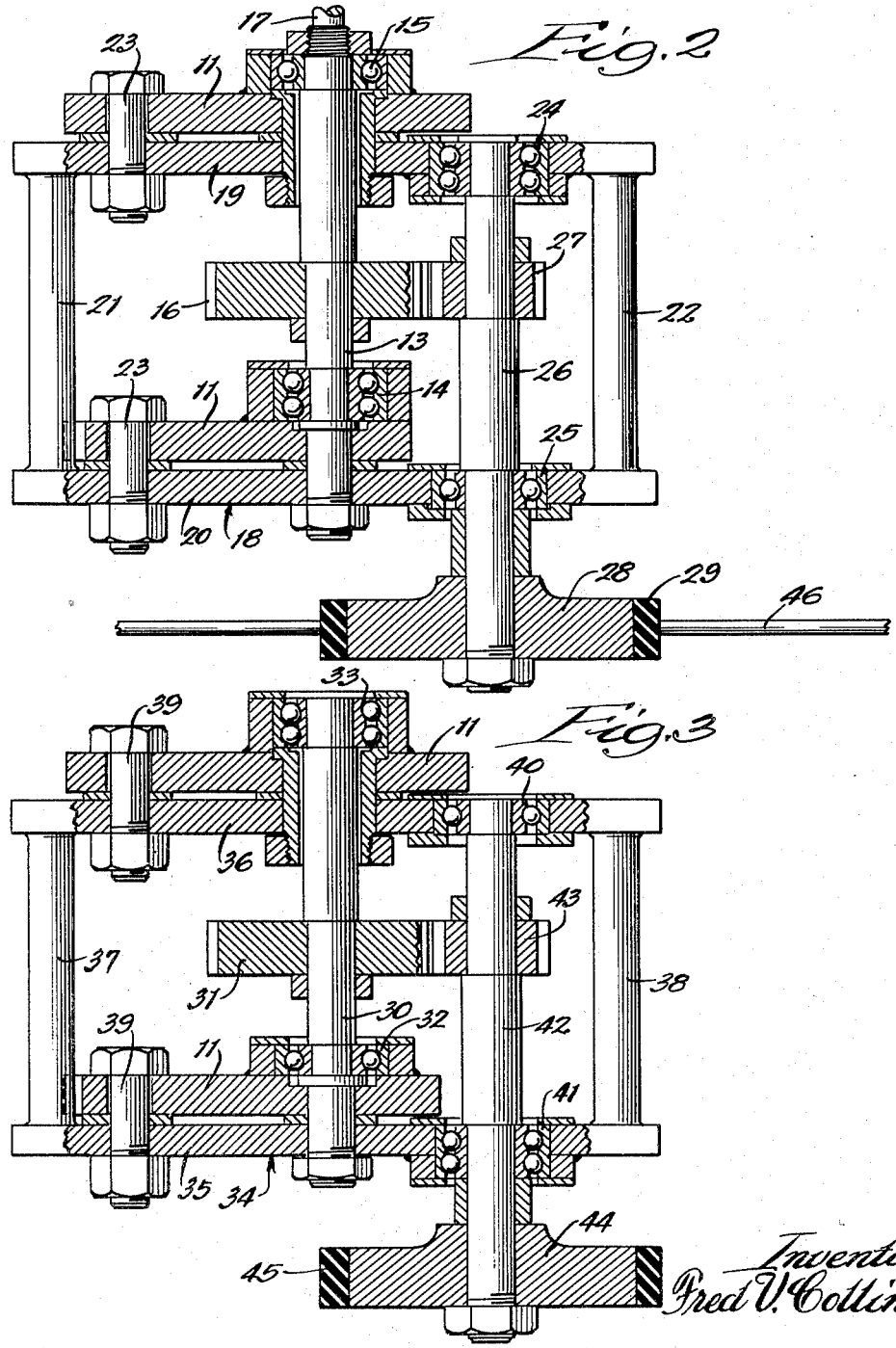

Patented Oct. 10, 1950

2,525,590

UNITED STATES PATENT OFFICE 2,525,590

FEED APPARATUS FOR TUBES

Fred V. Collins, Des Plaines, Ill., assignor to William F. Stahl, Kenilworth, Ill.

Application December 7, 1946, Serial No. 714,875

3 Claims. (Cl. 198—127)

This invention relates to feed apparatus, and is particularly useful in the feeding of tubes and other types of objects.

I have disclosed in my co-pending application Serial No. 651,642, now Patent No. 2,504,500 granted April 18, 1950, for Tube Forming Apparatus and Method, feed wheels which engage between them opposite sides of a tube and are rotated to draw the tube through the machine. The tubes are formed of cellulose acetate, vinyl acetate, vinyl chloride (co-polymer), or any other suitable material.

In the handling of tubes of the above character and other similar products, it is extremely important that the feed wheels engage the tube with just the proper amount of pressure or friction, and since the tubes are constantly being changed in diameter, it is important that means be provided for quickly adjusting the machine for adaptation to such tubes.

An object of the present invention is to provide simple and effective feed means which may be swung to bring the feed wheels to the desired positions whereby tubes may be fed between them under the necessary friction. Yet another object is to provide mechanism whereby the feed wheel supporting means may be readily adjusted to different spaced positions while at the same time maintaining them in constant engagement with the driving mechanism. Other specific objects and advantages will appear as the specification proceeds.

The invention is illustrated, in a preferred embodiment, by the accompanying drawing, in which—

Figure 1 is a side view in elevation of apparatus embodying my invention; Fig. 2, a plan sectional view, the section being taken as indicated at line 2—2 of Fig. 1; Fig. 3, a plan sectional view, the section being taken as indicated at line 3—3 of Fig. 1; and Fig. 4, an enlarged sectional view of a portion of the feed wheels with the tube gripped therebetween.

In the illustration given, 10 designates a casing in which two vertical side walls 11 are supported. The side walls 11 are provided on each side with arcuate slots 12, as shown more clearly in Fig. 1.

A central drive shaft 13 is mounted in the upper portion of the side plates 11, as shown more clearly in Fig. 2, being supported within the bearings 14 and 15. A driving gear 16 is mounted centrally on the shaft 13. The shaft 13 is extended at one side to provide a power shaft 17 adapted to be driven by a motor or by any other suitable power means.

Pivotally mounted upon the shaft 13 is a cradle or bell crank supporting structure 18. This structure comprises a pair of bell crank arms 19 and 20 joined at their ends by the cross strips 21 and 22. At their rear ends, the arms 19 and 20 are secured by bolts 23 which extend through the slots 12 so as to releasably lock the bell crank frame 18 in any desired angular position along the slots 12.

The crank arm 19 is provided near its forward side with a bearing 24, and the member 20 is provided near its forward side with a bearing 25. Mounted in the bearings 24 and 25 is a feed wheel shaft 26. The shaft 26 carries a pinion or driven gear 27 in constant mesh with the drive wheel 16. The shaft 26 is extended on one side and carries the drive wheel 28 equipped with a resilient tread 29.

Mounted below the drive shaft 13 in the standards 11 is a drive shaft 30. The shaft 30 carries centrally a drive gear 31 which meshes with the drive gear 16. The shaft 30 is mounted in bearings 32 and 33 carried by the standards 11.

A bell crank frame 34 is mounted upon the shaft 30, as shown more clearly in Fig. 3, and it consists of the two bell crank members 35 and 36 which are joined at their ends by the cross struts 37 and 38. Bolts 39 provide a means for securing each of the members 35 and 36 adjustably within the arcuate slots 12 of the standards 11. The member 36 is provided at its forward side with a bearing 40, and the member 35 is provided at its forward side with a bearing 41. A feed wheel shaft 42 is mounted in the bearings 40 and 41, and it carries a pinion or driven gear 43 meshing with the drive gear 31. The shaft 42 is extended on one side to receive and carry a drive wheel 44 provided with a resilient tread 45.

As shown more clearly in Fig. 4, the drive wheels 28 and 44 are spaced apart so that the treads 29 and 45 thereof engage between them the tube 46 which is drawn through the machine.

Operation

In the operation of the apparatus, the nuts of the bolts 23 and 39 may be loosened and the crank frames 18 and 34 swung upon their pivot shafts 13 and 30 respectively so as to adjust the feed wheels 28 and 44 to give the desired tension or friction upon the tube 46 extending therebetween. After this adjustment is made, the nuts of the bolts are tightened and the crank frames 18 and 34 are thus firmly secured in position. It will be noted that during the above adjustment operation, the pinions 27 and 43, by reason of their being mounted upon a structure pivotally carried by shafts 13 and 30, remain in engagement with the driving gears, no matter to what position the adjustment is made.

The motor or other power means then is set into operation, and power shaft 17 produces rotation of drive shaft 13. Since the drive gears 16 and 31 are in mesh, the two gears will rotate in opposite directions. The gear 16 rotates pinion 27, shaft 26, and feed wheel 28. The drive gear 31 rotates the driven gear 43, shaft 42, and feed wheel 44. The two wheels 28 and 44 move together in the direction of the arrows, as indicated in Fig. 1, and thus draw the tube 46 between them.

Should the size of the tube be changed, it requires but a moment to loosen the nuts of bolts 23 and 39 and to adjust the bell crank frames 18 and 34 so that the feed wheels 28 and 44 may be brought to the desired positions for feeding the new tube.

With the new apparatus, the operator can, without changing any driving part, swiftly move the wheels 28 and 44, or either one of them, so as to give a nicely graduated pressure upon the tube or other object being fed through the machine.

While in the foregoing specification, I have set forth a specific structure in great detail for the purpose of illustrating one embodiment of the invention, it will be understood that such details may be varied widely by those skilled in the art without departing from the spirit of my invention.

I claim:

1. In feed apparatus for plastic tubes and the like, a frame, a pair of drive shafts mounted in superposed relation, a driving gear in each of said shafts, said gears being in meshing relation, means for driving one of said shafts, a cradle mounted upon each of said shafts, a driven shaft carried by each cradle and provided with a driven gear meshing with said driving gear irrespective of the position of said cradle, feed wheels carried by said driven shafts adapted to receive a tube between them and to press on said tube to urge it forward, and releasable means for locking said cradles in any selected position for controlling the pressure exerted on the tube by said feed wheels.

2. In feed apparatus for plastic tubes and the like, a frame, a pair of drive shafts mounted in superposed relation in said frame, driving gears carried by said shafts and meshing with each other, means for driving one of said shafts, a cradle centrally pivoted upon each of said driving shafts, releasable cooperating means on one end portion of said cradle and said frame for locking said cradle in a selected position, a driven shaft on the other end of each of said cradles and carrying a driven gear meshing with the driving gear, and a feed wheel carried by each of said driven shafts, said feed wheels being adapted to receive between them a tube and to urge the same forward by frictional contact therewith.

3. In feed apparatus for tubes and the like, a frame, a pair of drive shafts mounted in superposed relation in said frame, driving gears carried by said shafts and meshing with each other, means for driving one of said shafts, a cradle centrally pivoted upon each of said driving shafts, cooperating means on one end portion of said cradle and said frame for locking said cradle in a selected position, a driven shaft on the other end of each of said cradles and carrying a driven gear meshing with the driving gear, and a feed wheel carried by each of said driven shafts, said cooperating locking means comprising arcuate slots in said frame and clamping bolts carried by said cradles.

FRED V. COLLINS.

REFERENCES CITED

The following references are of record in the file of this patent:

UNITED STATES PATENTS

| Number | Name | Date |
| --- | --- | --- |
| 437,208 | Kinney | Sept. 30, 1890 |
| 1,030,283 | Coda | June 25, 1912 |
| 1,301,679 | Gammeter | Apr. 22, 1919 |
| 1,494,174 | Lane | May 13, 1924 |
| 1,774,392 | McKee | Aug. 26, 1930 |